US007018684B2

(12) United States Patent
Berneth et al.

(10) Patent No.: US 7,018,684 B2
(45) Date of Patent: Mar. 28, 2006

(54) BLOCK COPOLYMERS FOR OPTICAL DATA STORAGE

(75) Inventors: Horst Berneth, Leverkusen (DE); Thomas Bieringer, Odenthal (DE); Rainer Hagen, Leverkusen (DE); Serguei Kostromine, Swisttal (DE); Hans-Werner Schmidt, Bayreuth (DE); Axel Müller, Wiesbaden (DE); Stephan Zilker, München (DE); Carsten Frenz, Schlüchtern (DE); Thomas Breiner, Cambridge, MA (US)

(73) Assignee: Bayer Aktiengesellschaft, Leverkusen (DE)

( * ) Notice: Subject to any disclaimer, the term of this patent is extended or adjusted under 35 U.S.C. 154(b) by 135 days.

(21) Appl. No.: 10/296,684

(22) PCT Filed: May 18, 2001

(86) PCT No.: PCT/EP01/05710

§ 371 (c)(1),
(2), (4) Date: Apr. 8, 2003

(87) PCT Pub. No.: WO01/92360

PCT Pub. Date: Dec. 6, 2001

(65) Prior Publication Data

US 2003/0183959 A1 Oct. 2, 2003

(30) Foreign Application Priority Data

May 31, 2000 (DE) ................................ 100 27 153

(51) Int. Cl.
*C09K 19/38* (2006.01)
*G11B 7/24* (2006.01)
*C08F 8/00* (2006.01)

(52) U.S. Cl. ...................... 428/1.1; 252/299.01; 430/2; 430/270.11; 430/270.14; 359/3; 359/10; 525/242

(58) Field of Classification Search ........... 430/270.11, 430/270.14, 270.1, 2; 252/299.01; 428/1.1; 359/3, 10; 264/1.33; 525/242
See application file for complete search history.

(56) References Cited

U.S. PATENT DOCUMENTS

| 5,041,510 | A |   | 8/1991  | Allen et al.       | 526/243   |
|-----------|---|---|---------|--------------------|-----------|
| 5,087,672 | A | * | 2/1992  | Babirad et al.     | 525/329.5 |
| 5,155,195 | A |   | 10/1992 | Feuer              | 526/243   |
| 5,173,381 | A |   | 12/1992 | Natansohn et al.   | 430/19    |
| 5,212,250 | A | * | 5/1993  | McCulloch et al.   | 525/276   |
| 5,384,378 | A |   | 1/1995  | Etzbach et al.     | 526/256   |
| 5,466,496 | A | * | 11/1995 | Jin                | 428/1.3   |
| 5,496,670 | A | * | 3/1996  | Hvilsted et al.    | 430/56    |
| 5,543,267 | A | * | 8/1996  | Stumpe et al.      | 430/290   |
| 5,620,781 | A | * | 4/1997  | Akashi et al.      | 428/195.1 |
| 5,641,846 | A |   | 6/1997  | Bieringer et al.   | 526/292.2 |
| 5,763,548 | A |   | 6/1998  | Matyjaszewski et al. | 526/135 |
| 5,858,585 | A | * | 1/1999  | Haarer et al.      | 430/20    |
| 6,106,948 | A | * | 8/2000  | Wang et al.        | 428/413   |
| 6,423,799 | B1 | * | 7/2002 | Berneth et al.    | 526/218.1 |
| 6,803,153 | B1 | * | 10/2004 | Kawano et al.     | 430/1     |

FOREIGN PATENT DOCUMENTS

| DE | 100 27 153  | * | 12/2001 |
|----|-------------|---|---------|
| EP | 571271      |   | 11/1993 |
| EP | 659865      |   | 6/1995  |
| EP | 704513      |   | 4/1996  |
| EP | 990665      |   | 4/2000  |
| JP | 05-323296   | * | 12/1993 |
| JP | 2004-059897 | * | 2/2004  |
| WO | 91/07449    | * | 5/1991  |
| WO | 97/44365    |   | 11/1997 |
| WO | 00/54111    | * | 9/2000  |
| WO | 00/54112    | * | 9/2000  |
| WO | 00/60586    | * | 10/2000 |

OTHER PUBLICATIONS

English translation of Chino.*
English abstract of Mitsunabe et al.*
Makromol. Chem., Rapid Commun. 10, pp. 477-483, (month unavailable) 1989, Klaus Anderle et al, "Laser-Induced Reorientation of the Optical Axis in Liquid-Crystalline Side Chain Polymers".
Chem. Mater., 5, (month unavailable) 1993, pp. 403-411, S. Xie et al, "Recent Developments in Aromatic Azo Polymers Research".
Mol. Cryst. Liq. Cryst., vol. 169, (month unavailable) 1989, pp. 133-166, J. H. Wendorff et al, "Nonlinear Optical Phenomena in Liquid Crystalline Side Chain Polymers".
Makromol. Chem., Rapid Commun., 8, (month unavailable) 1987, pp. 467-471, M. Eich et al, "Erasable Holograms in Polymeric Liquid Crystals".
Applied Optics, vol. 34, No. 5, Feb. 10, 1995, pp. 846-853, Uh-Sock Rhee et al, "Dynamics of Hologram Recording in DuPont Photopolymer".

* cited by examiner

*Primary Examiner*—Shean C Wu
(74) *Attorney, Agent, or Firm*—Joseph C. Gil; Aron Preis

(57) ABSTRACT

Block polymers suitable for the preparation of data storage media are disclosed. The media produced of the inventive of the polymers has thickness in the range of a few millimeters. In contrast with currently available materials that feature high optical density the inventive polymers feature increased dilution of dyes (decrease in optical density) and decrease in the holographic diffraction efficiency.

20 Claims, No Drawings

BLOCK COPOLYMERS FOR OPTICAL DATA STORAGE

The invention relates to block polymers and the use of the latter for optical data storage.

Photoaddressable polymers are known (Polymers as electrooptical and fotooptical active media, V. P. Shibaev (ed.), Springer Verlag, New York 1995). Particularly suitable for this purpose are side-group polymers, of which the group of the copolymers is distinguished by very wide possibilities in the variation of the properties. Their special peculiarity is that their optical properties such as absorption, emission, reflection, birefringence, scatter may be changed reversibly by light induction. Polymers of this kind have a particular comb-like structure: on a linear spine sit—connected by molecule parts acting as spacers—side groups which may absorb electromagnetic radiation. Examples of this kind are dye molecules, in particular the side-group polymers containing azobenzene groups according to U.S. Pat. No. 5,173, 381. Said substances are characterised by the capacity to form a directional birefringence when irradiated with polarised light. The inscribed birefringence patterns may be made visible in the polarised light.

It is furthermore known that there may be inscribed in layers of said polymers at any point with polarised light a locally limited birefringence whose main axis moves in sympathy on the rotation of the polarising direction (K. Anderle, R. Birenheide, M. Eich, J. H. Wendorff, Makromol. Chem., Rapid Commun. 10, 477–483 (1989), J. Stumpe et al., 20th Freiburg Working Conference on Liquid Crystals 1991).

Suitable in principle for the production of the photoaddressable substrate are all polymers into which a directional birefringence may be inscribed (Polymers as electrooptical and fotooptical active media, V. P. Shibaev (ed.), Springer Verlag, New York 1995; Natansohn et al., Chem. Mater. 1993, 403–411). These are in particular side-group polymers, of which the copolymers are preferred. Preferred such copolymers are disclosed for example in DE-A 43 10 368 and DE-A 44 34 966. Preferably they contain a poly(meth) acrylate main chain acting as a spine with recurring

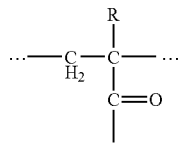

units, wherein R represents hydrogen or methyl, the dots indicate the linkage of the further units of the main chain and the side chain is linked to the carbonyl group.

From DE-A-19 620 588 are known polymers which contain side chains branching off from the main chain and having the formulae S-T-Q-P with P=A, M:

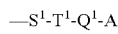 (I) and

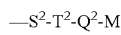 (II), wherein $S^1$, $S^2$ signify independently of one another the atoms O, S or the group $NR^1$, $R^1$ signifies hydrogen or $C_1$–$C_4$ alkyl, $T^1$, $T^2$ signify independently of one another the group $(CH_2)_n$, which optionally may be interrupted by —O—, —$NR^1$— or —$OSiR^1_2O$— and/or substituted by methyl or ethyl, and n signifies the numbers 2, 3 or 4, $Q^1$, $Q^2$ a divalent group, A a unit which may absorb electromagnetic radiation and M a polarisable aromatic group having at least 12 π-electrons.

The function of M is cO-Operative re-orientation together with the actual absorbing units. This results in a strengthening of the re-orientation and stabilisation of the re-oriented molecules.

Particularly preferred are polymers in which $Q^1$, $Q^2$ signify independently of one another $Z^1$, $Z^2$ or the group -$Z^1$-X-$Z^2$-, wherein $Z^1$, $Z^2$ signify independently of one another the groups —S—, —$SO_2$-, —O—, —COO—, —OCO—, 13 $CONR^1$—, —$NR^1CO$—, —$NR^1$—, —N=N—, —CH=CH—, —N=CH—, —CH=N— or the group —$(CH_2)_m$- with m=1 or 2 and X signifies a 5- or 6-member cycloaliphatic, aromatic or heterocyclic ring, for the case $Z^1$=—COO— or —$CONR^1$— a direct link or the group —(CH=CH)$_m$-, where m has the signification given above, A signifies the residue of a mono-azo dye which absorbs in the wavelength range between 650 and 340 nm, and M signifies the residue of a polarised and further polarisable aromatic, linearly structured system having at least 12π-electrons.

Preferred groups A correspond to the formula

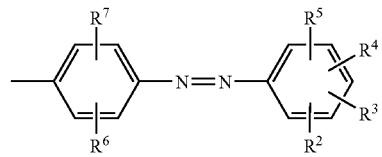

where $R^1$ to $R^7$ signify independently of one another hydrogen, hydroxyl, halogen, nitro, cyano, $C_1$–$C_4$-alkyl, $C_1$–$C_4$-alkoxy, $CF_3$, $CCl_3$, $CBr_3$, $SO_2CF_3$, $C_1$–$C_6$-alkyl-sulfonyl, phenylsulfonyl, $C_1$–$C_6$-alkylaminosulfonyl, phenylaminosulfonyl, aminocarbonyl, $C_1$–$C_6$-alkylaminocarbonyl, phenylaminocarbonyl or $COOR^1$.

Preferred groups M correspond to the formula

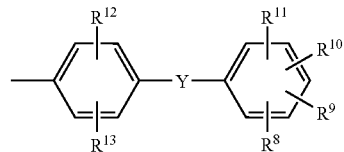

where $R^8$ to $R^{13}$ signify independently of one another hydrogen, hydroxyl, halogen, nitro, cyano, $C_1$–$C_4$-alkyl, $C_1$–$C_4$-alkoxy, $CF_3$, $CCl_3$, $CBr_3$, $SO_2CF_3$, $C_1$–$C_6$-alkyl-sulfonyl, phenylsulfonyl, $C_1$–$C_6$-alkylaminosulfonyl, phenylaminosulfonyl aminocarbonyl, $C_1$–$C_6$-alkylaminocarbonyl, phenylaminocarbonyl or $COOR^1$ and Y signifies —COO—, —OCO—, —CONH—, —NHCO—, —O—, —NH—, —N(CH$_3$)— or a single bond.

Amorphous polymers are preferred, i.e. ones which do not form macroscopically discernible liquid crystalline phases. "Amorphous" means an optically isotropic state. Such polymers neither scatter visible light nor possess a birefringence in the initial isotropic state without the action of external forces.

A process for producing the radical polymerisation is likewise mentioned.

Materials for holographic data storage are likewise known.

Holography is a process in which, through the interference of two coherent beams of light (signal wave and reference wave), objects may be imaged in suitable storage materials and said images may be read out again with light (reading beam) (D. Gabor, Nature 151, 454 (1948), N. H. Farath, Advances in holography, Vol. 3, Marcel Decker (1977), H. M. Smith, Holographic recording materials, Springer (1977). By changing the angle between signal and reference wave on the one hand and the holographic storage material on the other, numerous holograms may be inscribed into the material and finally also read out again individually. As a rule, the light of a laser serves as a coherent light source. Many different materials are described as storage material, e.g. inorganic crystals such as LiNbO$_3$ (e.g.), organic polymers (e.g. M. Eich, J. H. Wendorff, Makromol. Chem., Rapid Commun. 8, 467 (1987), J. H. Wendorff, M. Eich, Mol. Cryst. Liq. Cryst. 169, 133 (1989)) or Fotopolymere (Uh-Sock Rhee et al., Applied Optics, 34 (5), 846 (1995)).

Said materials, however, still do not meet all the requirements of a holographic recording medium. In particular they do not possess adequate stabilities of the inscribed hologram. Multiple inscription is possible to only a limited extent as a rule, since with the inscription of a new hologram the hologram already inscribed is overwritten and hence erased. This applies in particular to inorganic crystals, which are subjected to a complex heat treatment in order to compensate for said stability problems. Photopolymers conversely exhibit the problem of shrinkage, which has a negative effect on the holographic imaging properties.

Materials with high stability of the inscribed holograms are likewise known, e.g. from EP-A 0 704 513.

The high optical density of said materials does not however permit the production of high-volume holographic stores, such as are required for the storage of numerous holograms in a storage material.

There was therefore a requirement for a material which is suitable for the production of sufficiently thick high-volume holographic stores. The thickness of the materials should lie in the range of millimetres. With the materials of the prior art, the penetration of the laser beams almost always presents problems by virtue of the high optical density.

The object was an avoidance of this problem with simultaneous guaranteeing of the high storage efficiency. It can be observed that with increasing dilution of the dyes in copolymers (decrease in the optical density) a decrease in the holographic diffraction efficiency is also to be observed.

Surprisingly it has now been found that polymers with specific architectures do not exhibit said disadvantage.

The present application therefore provides a polymer having various blocks characterised in that it consists of
at least one block (A) having at least 3 repeat units with the general formula (CI)

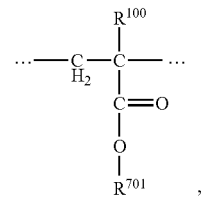

(CI)

where
$R^{100}$ represents hydrogen or methyl and
$R^{701}$ represents hydrogen or C$_1$–C$_8$ linear or branched alkyl without photo-isomerisable groups, preferably methyl, ethyl, propyl, n-butyl, particularly preferably methyl, and
at least one block (B) having repeat units with the general formula (CII)

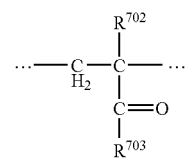

(CII)

where
$R^{702}$ represents hydrogen or methyl and
$R^{703}$ represents [—S-T-Q-P] and where P represents A and/or M,
where however a polymer (B) is always contained in which P represents A.

The side-Chains branching off from the main chain, of the formula S-T-Q-P with P=A (dye group), M (mesogen), are governed by the following definitions:

S-T-Q-P=S$^1$-T$^1$-Q$^1$-A

S-T-Q-P=S$^2$-T$^2$-Q$^2$-M where
S$^1$, S$^2$ signify independently of one another the atoms O, S or the group NR$^1$,
R$^1$ signifies hydrogen or C$_1$–C$_4$ alkyl,
T$^1$, T$^2$ signify independently of one another the group (CH$_2$)n, which may optionally be interrupted by —O—, —NR$^1$— or —OSiR$^1_2$O— and/or substituted by methyl or ethyl,
n signifies the numbers 2, 3 or 4,
Q$^1$, Q$^2$ a divalent group,
A a unit which may absorb electromagnetic radiation and
M a polarisable aromatic group having at least 12 π-electrons.

The function of M is cO-Operative re-orientation together with the actual absorbing units. This results in a strengthening of the re-orientation and stabilisation of the re-oriented molecules.

Particularly preferred are polymers in which
Q$^1$, Q$^2$ signify independently of one another Z$^1$, Z$^2$ or the group -Z$^1$-X-Z$^2$-, where
Z$^1$, Z$^2$ signify independently of one another the groups —S—, —SO$_2$—, —O—, —COO—, —OCO—, —CONR$^1$—, —NR$^1$CO—, —NR$^1$—, —N=N—, —CH═CH—, —N═CH—, —CH═N— or the group —(CH$_2$)$_m$— with m=1 or 2 and X signifies a 5- or 6-member cycloaliphatic, aromatic or heterocyclic ring, for the case Z$^1$═—COO— or —CONR$^1$— a direct bond or the group —(CH═CH)$_m$—, where m has the signification given above, A signifies the residue of a mono-azo dye which absorbs in the wavelength range between 650 and 340 nm and M the residue of a polarised and further polarisable aromatic, linearly structured system having at least 12 π-electrons.

Preferred A groups correspond to the formula

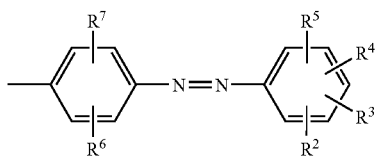

where

R$^2$ to R$^7$ signify independently of one another hydrogen, hydroxyl, halogen, nitro, cyano, C$_1$–C$_4$ alkyl, C$_1$–C$_4$ alkoxy, CF$_3$, CCl$_3$, CBr$_3$, SO$_2$CF$_3$, C$_1$–C$_6$-alkyl-sulfonyl, phenylsulfonyl, C$_1$–C$_6$-alkylaminosulfonyl, phenylaminosulfonyl, aminocarbonyl, C$_1$–C$_6$-alkylaminocarbonyl, phenylaminocarbonyl or COOR$^1$.

Preferred M groups correspond to the formula

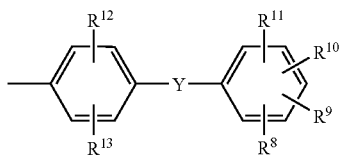

where

R$^8$ to R$^{13}$ signify independently of one another hydrogen, hydroxyl, halogen, nitro, cyano, C$_1$–C$_4$ alkyl, C$_1$–C$_4$ alkoxy, CF$_3$, CCl$_3$, CBr$_3$, SO$_2$CF$_3$, C$_1$–C$_6$ alkyl-sulfonyl, phenylsulfonyl, C$_1$–C$_6$-alkylaminosulfonyl, phenylaminosulfonyl, aminocarbonyl, C$_1$–C$_6$-alkylaminocarbonyl, phenylaminocarbonyl or COOR$^1$ and Y signifies —COO—, —OCO—, —CONH—, —NHCO—, —O—, —NH—, —N(CH$_3$)— or a single bond.

Particularly good results are obtained if there are contained in the block (A) at least 5, preferably at least 20, particularly preferably at least 75 repeat units.

A plurality of repeat units should also be present in the block (B), at least 3, preferably at least 5, particularly preferably at least 10 and most preferably of all at least 20 repeat units are contained.

Naturally it is also included by the present invention that more than 1 block (A) and/or (B) is contained.

Very good results are obtained if the ratio of the sum of the monomers of block (B) to the sum of the monomers of block (A) lies between 1:1 and 1:10 000, preferably between 1:1 and 5000, particularly preferably between 1:2 and 1:3000, very particularly preferably between 1:5 and 1:1500 and most preferably of all between 1:10 and 1:1000.

Preferred are copolymers in which block (A) contains methyl methacrylate units.

Good results are achieved when blocks (B) having elements which bear STQP are present. An improved embodiment consists in block (B) containing at least 2 different monomers which bear the general formula [STQP], wherein at least one of said monomers bears a dye group, preferably a photoisomerisable group. It is further particularly preferable that said photoisomerisable group is an azo group. Most particularly preferably said group has the structure of the formula (CIV).

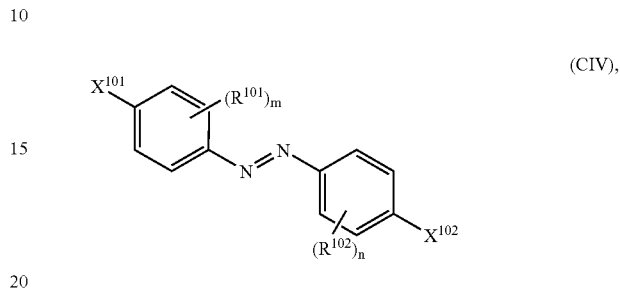

where

R$^{101}$ and R$^{102}$ represent independently of one another hydrogen or a nonionic substituent, m and n represent independently of one another a whole number from 0 to 4, preferably 0 to 2, X$^{101}$ represents the linkage with S$^{101}$T$^{101}$Q$^{101}$, i.e. X$^{101}$ has the signification X$^{101'}$, where X$^{101'}$ is linked to the Q with the 2nd valency, X$^{102}$ signifies X$^{102'}$—R$^{104}$, X$^{101'}$ and X$^{102'}$ represents a direct bond, —O—, —S—, —(N—R$^{105}$)—, —C(R$^{106}$R$^{107}$)—, —(C═O)—, —(CO—O)—, —(CO—NR$^{105}$)—, —(SO$_2$)—, —(SO$_2$—O)—, —(SO$_2$—NR$^{105}$)—, —(C═NR$^{18}$)— or —(CNR$^{18}$—NR$^{15}$)—, R$^{104}$, R$^{15}$ and R$^{18}$ stand independently of one another for hydrogen, C$_1$- to C$_{20}$-alkyl, C$_3$- to C$_{10}$-cycloalayl, C$_2$- to C$_{20}$-alkenyl, C$_6$- to C$_{10}$-aryl, C$_1$- to C$_{20}$-alkyl-(C═O)—, C$_3$- to C$_{10}$-cycloalkyl-(C═O)—, C$_2$- to C$_{20}$-alkenyl-(C═O)—, C$_6$- to C$_{10}$-aryl-(C═O)—, C$_1$- to C$_{20}$-alkyl-(SO$_2$)—, C$_3$- to C$_{10}$-Cycloalkyl-(SO$_2$)—, C$_2$- to C$_{20}$-alkenyl-(SO$_2$)— or C$_6$- to C$_{10}$-aryl-(SO$_2$)— or X$^{102'}$—R$^{104}$ may represent hydrogen, halogen, cyano, nitro, CF$_3$ or CCl$_3$, R$^{106}$ and R$^{107}$ represent independently of one another hydrogen, halogen, C$_1$ to C$_{20}$ alkyl, C$_1$- to C$_{20}$-alkoxy, C$_3$- to C$_{10}$-cycloalkyl, C$_2$- to C$_{20}$-alkenyl or C$_6$- to C$_{10}$-aryl, S$^{101}$ signifies the atoms O, S or the group NR$^{109}$, R$^{109}$ signifies hydrogen or C$_1$–C$_4$-alkyl, T$^{101}$ signifies the group (CH$_2$)$_x$, which may optionally be interrupted by —O—, —N$^{109}$— or —OSiR$^{109}$$_2$O— and/or substituted by methyl or ethyl, x signifies the numbers 2, 3 or 4, Q$^{101}$ signifies Z$^{101}$, Z$^{102}$ or the group -Z$^{101}$-X$^{100}$-Z$^{102}$, where Z$^{101}$ and Z$^{102}$ signify independently of one another the groups —S—, —SO$_2$—, —COO—, —OCO—, —CONR$^{109}$—, —NR$^{109}$CO—, —NR$^{109}$—, —N═N—, —CH═CH—, —N═CH—, —CH═N— or the group —(CH$_2$)$_y$— with y=1 or 2 and X$^{100}$ signifies a 5- or 6-member cycloaliphatic, aromatic or heterocyclic ring, for the case Z$^{101}$═—COO— or —CONR$^{109}$— a direct bond or the group —(CH═CH)$_y$—, where y has the signification given above.

By nonionic substituents are to be understood halogen, cyano, nitro, C$_1$- to C$_{20}$-alkyl, C$_1$- to C$_{20}$-alkoxy, phenoxy, $C_3$- to $C_{10}$-cycloalkyl, $C_2$- to $C_{20}$-alkenyl or $C_6$- to $C_{10}$-aryl, $C_1$- to $C_{20}$-alkyl-(C=O)—, $C_6$- to $C_{10}$-aryl-(C=O)—, $C_1$- to $C_{20}$-alkyl-(SO$_2$) —, $C_1$–$C_{20}$-alkyl-(C=O)—O—, $C_1$- to $C_{20}$-alkyl-(C=O)—NH—, $C_6$- to $C_{10}$-aryl-(C=O)—NH—, $C_1$- to $C_{20}$-alkyl-O—(C=O)—, $C_1$- to $C_{20}$-alkyl-NH—(C=O)— or $C_6$- to $C_{10}$-aryl-NH—(C=O)—.

The alkyl, cycloalkyl, alkenyl and aryl groups may for their part be substituted by up to 3 groups from the series halogen, cyano, nitro, $C_1$- to $C_{20}$-alkyl, $C_1$- to $C_{20}$-alkoxy, $C_3$- to $C_{10}$-cycloalkyl, $C_2$- to $C_{20}$-alkenyl or $C_6$- to $C_{10}$-aryl and the alkyl and alkenyl groups may be straight-chain or branched.

By halogen is to be understood fluorine, chlorine, bromine and iodine, in particular fluorine and chlorine.

Preferred are polymers characterised in that the monomers with the photoisomerisable group exhibit the formula (CV)

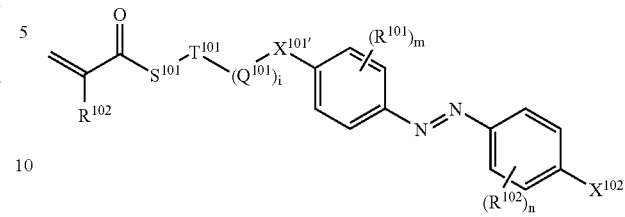

where
$R^{102}$ represents hydrogen or methyl and
the other groups possess the signification given above.

Particularly preferred monomers which bear the photoisomerisable group (A) are:

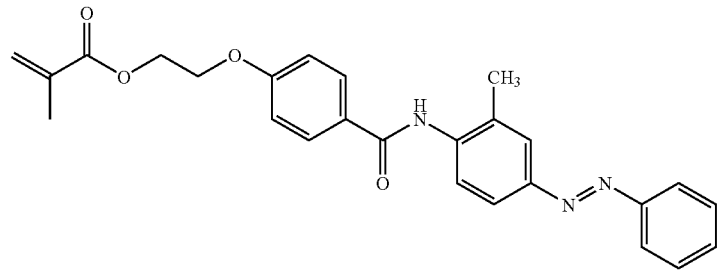

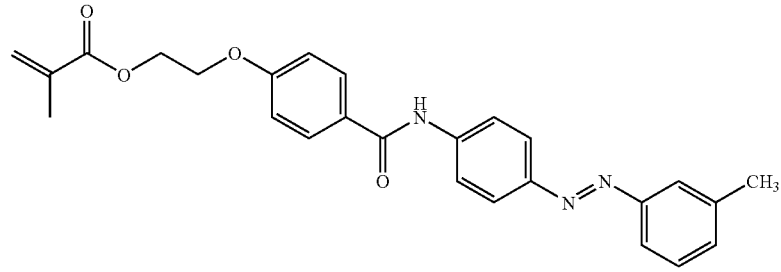

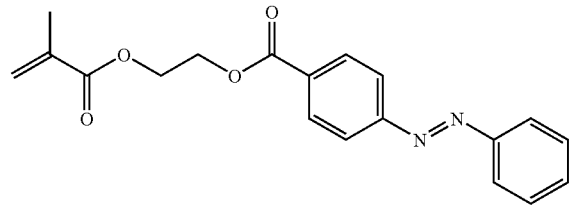

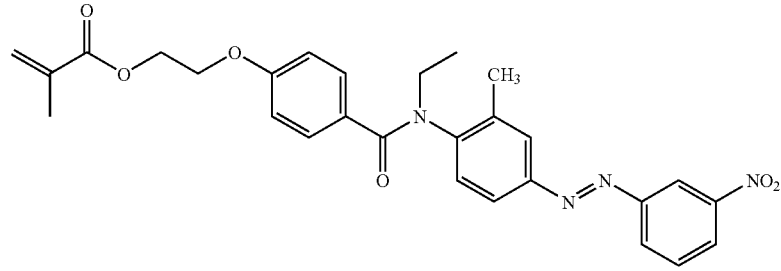

-continued

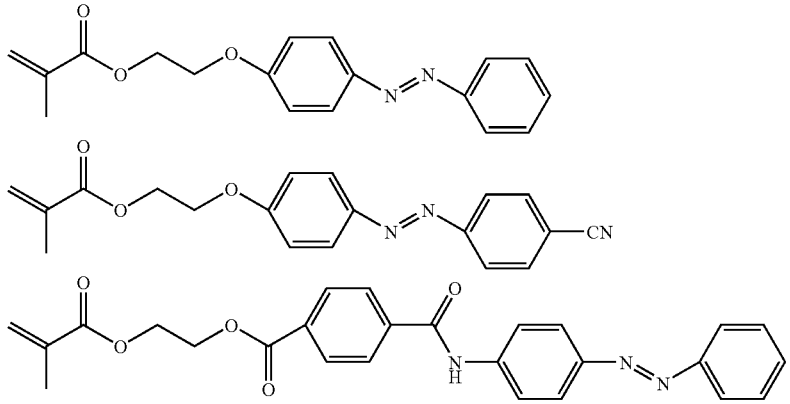

Likewise preferred are block copolymers characterised in that they contain in addition to monomers with the photoisomerisable group A, preferably those having the formula (CV), monomers with the polarisable aromatic group M having the formula (CVI)

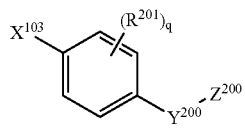
(CVI), where
$Z^{200}$ represents a group with the formulae

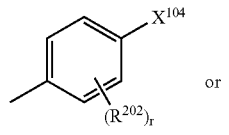
(CVIa)

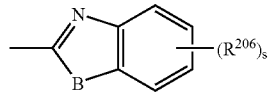
(CVIb)

where
B represents O, S or N—$C_1$- to $C_4$-alkyl,
$X^{103}$ represents —$X^{103t}$—$(Q^{102})_j$-$T^{102}$-$S^{102}$—
$X^{104}$ represents $X^{104t}$—$R^{203}$,
$X^{103t}$ and $X^{104t}$ represent independently of one another a direct bond, —O—, —S—, —(N—$R^{205}$)—, —C($R^{206}R^{207}$)—, —(C=O)—, —(CO—O)—, —(CO—N$R^{205}$)—, —(SO$_2$)—, —(SO$_2$—O)—, —(SO$_2$—N$R^{205}$)—, —(C=N$R^{208}$)— or —(CN$R^{208}$—N$R^{205}$)—,
$R^{205}$, $R^{208}$ and $R^{203}$ represent independently of one another hydrogen, $C_1$- to $C_{20}$-alkyl, $C_3$- to $C_{10}$-cycloalkyl, $C_2$- to $C_{20}$-alkenyl, $C_6$–$C_{10}$-aryl, $C_1$–$C_{20}$-alkyl-(C=O)—, $C_3$–$C_{10}$-cycloalkyl-(C=O)—, $C_2$–$C_{20}$-alkenyl-(C=O)—, $C_6$- to $C_{10}$-aryl-(C=O)—, $C_1$- to $C_{20}$-alkyl-(SO$_2$)—, $C_3$- to $C_{10}$-cycloalkyl-(SO$_2$)—, $C_2$- to $C_{20}$-alkenyl-(SO$_2$)— or $C_6$- to $C_{10}$-aryl-(SO$_2$)— or $X^{104t}$—$R^{203}$ may represent hydrogen, halogen, cyano, nitro, $CF_3$ or $CCl_3$,
$R^{206}$ and $R^{207}$ represent independently of one another hydrogen, halogen, $C_1$ to $C_{20}$-alkyl, $C_1$ to $C_{20}$-alkoxy, $C_3$- to $C_{10}$-cycloalkyl, $C_2$- to $C_{20}$-alkenyl or $C_6$- to $C_{10}$-aryl,
$Y^{200}$ represents a single bond, —COO—, OCO—, —CONH—, —NHCO—, —CON(CH$_3$)—, —N(CH$_3$)CO—, —O—, —NH— or —N(CH$_3$)—,
$R^{201}$, $R^{202}$, $R^{206}$ represent independently of one another hydrogen, halogen, cyano, nitro, $C_1$- to $C_{20}$-alkyl, $C_1$- to $C_{20}$-alkoxy, phenoxy, $C_3$- to $C_{10}$-cycloalkyl, $C_2$- to $C_{20}$-alkenyl or $C_6$- to $C_{10}$-aryl, $C_1$- to $C_{20}$-alkyl-(C=O)—, $C_6$- to $C_{10}$-aryl-(C=O)—, $C_1$- to $C_{20}$-alkyl-(SO$_2$)—, $C_1$–$C_{20}$-alkyl-(C=O)—O—, $C_1$- to $C_{20}$-alkyl-(C=O)—NH—, $C_6$- to $C_{10}$-aryl-(C=O)—NH—, $C_1$- to $C_{20}$-alkyl-O—(C=O)—, $C_1$- to $C_{20}$-alkyl-NH—(C=O)— or $C_6$- to $C_{10}$-aryl-NH—(C=O)—,
q, r and s represent independently of one another a whole number from 0 to 4, preferably 0 to 2,
$Q^{102}$ represents —O—, —S—, —(N—$R^{205}$)—, —C($R^{206}R^{207}$)—, —(C=O)—, —(CO—O)—, —(CO—N$R^{205}$)—, —(SO$_2$)—, —(SO$_{2-0}$)—, —(SO$_2$—N$R^{205}$)—, —(C=N$R^{208}$)—, —(CN$R^{208}$—N$R^{205}$)——(CH$_2$)$_p$—, p- or m-$C_6H_4$— or a divalent group with the formulae

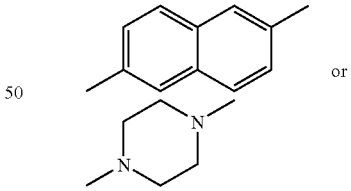

j represents a whole number from 0 to 4, where for j>1 the individual $Q^{102}$ may have different significations,
$T^{102}$ represents —(CH$_2$)$_p$—, where the chain may be interrupted by —O—, —N$R^{209}$— or —OSi$R^{220}_2$O—,
$S^{102}$ represents a direct bond, —O—, —S— or —N$R^{209}$—,
p represents a whole number from 2 to 12, preferably 2 to 8, in particular 2 to 4,
$R^{209}$ represents hydrogen, methyl, ethyl or propyl and
$R^{220}$ represents methyl or ethyl.

Preferred monomers having such groups exhibiting form anisotropy M then have the formula (CVII):

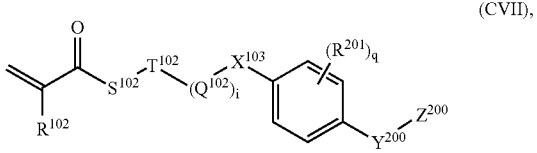

where
$R^{102}$ represents hydrogen or methyl and
the other groups have the meanings given above.

Particularly preferred monomers exhibiting form anisotropy with the formula (CVII) are for example:

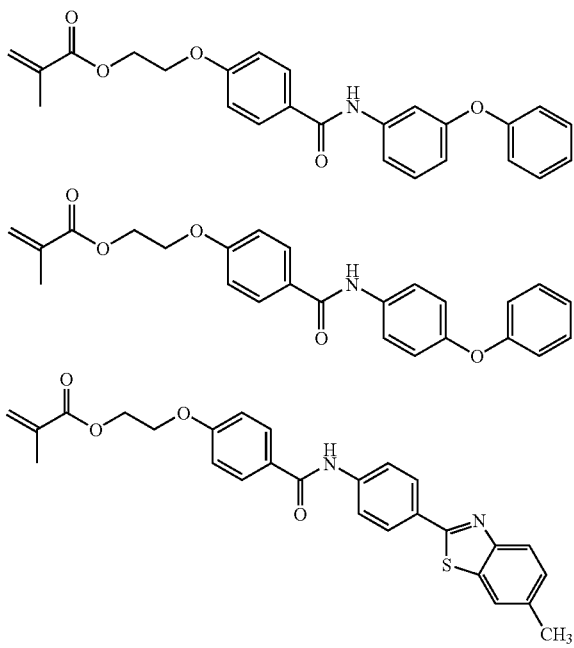

The block copolymers according to the invention contain in addition to at least one polymer (A)

a) preferably at least one polymer (B) which consists of monomers with the formula (CV),
b) preferably at least one polymer (B) which consists of monomers with the formula (CV) and at least one polymer (B) which consists of monomers with the formula (CVII),
c) particularly preferably at least one polymer which consists of monomers with the formula (CV) and monomers with the formula (CVII).

In case a) the monomers with the formula (CV) of polymer (B) may be identical or different. The same applies to the monomers (CV) and/or (CVII) in polymers (B) in the cases b) and c).

The monomers with the formula (CV) and the formula (CVII) are used in the block copolymers according to the invention in the ratio 1:1 to 1:30, preferably 1:1 to 1:20, particularly preferably 1:2 to 1:10.

In addition to the controlled radical polymerisation, it is also possible to produce the AB block copolymers described in the patent by a combination of anionic polymerisation and subsequent polymer-analogous reaction. In this case first of all an AB block copolymer is produced by sequential, living anionic polymerisation, which contains in a block, either A or B, a protected functional group. After the polymerisation the functional group is liberated. A photoisomerisable and/or mesogenic side group is introduced by polymer-analogous conversion. The side groups are identical with the structure given in formula (IV). The polymer-analogous conversion is preferably to take place with a conversion rate of 20 to 100%.

An important parameter for the present invention is the optical density, which possesses for the wavelength of the writing laser and a sample thickness of 1 mm, a value $\leq 2$, preferably $\leq 1$, particularly preferably of $\leq 0.3$. In this way it may be ensured that the actinic light leads to a homogeneous transillumination of the entire storage medium and a thick hologram may be produced. The optical density may be determined with commercial UV/VIS spectrometers (e.g. CARY, 4G).

In particular the block copolymer according to the invention is a material which has a transilluminated thickness of $\geq 0.1$ mm, particularly 0.5 mm, preferably $\geq 1$ mm and most particularly preferably not greater than 1 cm.

The grouping which interacts with the electromagnetic radiation is preferably a dye described above, which absorbs preferably in the wavelength range between 390 and 800 nm, particularly preferably around the range 400 to 650 nm and most particularly preferably in the range from 510 to 570 nm. An Nd:YAG laser ($\lambda$=532 nm) may be used as a typical test laser For the reading the recording material is no longer exposed to two interfering beams, as during the writing, but only to one beam, the reading beam.

The wavelength of the reading beam is preferably longer than that of the signal and reference waves, for example 70 to 500 nm longer. Reading with the wavelength of the writing laser is however also possible and is employed in particular during the commercial use of large-volume holographic stores. In this case, however, during the reading operation the energy of the reading beam is lowered either by the reduction of the exposure intensity or the exposure time or by a reduction of the exposure intensity and the exposure time.

The optical density of the block copolymer according to the invention is determined by the concentration of the at least one dye in the copolymeric material.

Method for the Synthesis of Functionalised AB Block Copolymers According to the Invention by Controlled Polymerisation The synthesis of AB block copolymers with functionalised methacrylates and acrylates is produced with the aid of a controlled radical polymerisation or a combination of anionic polymerisation and subsequent polymer-analogous reaction.

In this case a non-functionalised block forms the matrix (A block), while in the B block the photo-active or mesogenic side chains are bonded to the acrylate or methacrylate monomers via spacers with a length of 0–6 $CH_2$ units. The B block may further consist of a static copolymer of photo-active or mesogenic monomers, wherein the proportion of the photo-active component may lie between 0 and 100%. In comparison with the prior art (e.g. Kathryn L. Beers, Sohyun Boo, Scott G. Gaynor, and Krzysztof Matyjaszewski, Macromolecules 1999, 32, 5772–5776; Andreas Mühlbach, Scott G. Gaynor, Krzysztof Matyjaszewski, Macromolecules 1999, 31, 6046–6052; Devon A. Shipp, Jen-Lung Wang and Krzysztof Matyjaszewski, Macromolecules 1999, 32, 5772–5776) in the controlled radical polymerisation the polymers described here are distinguished by the fact that use is made for the first time in a controlled radical polymerisation of monomers which bear as side chains a group A which may absorb electromagnetic radiation in the visible light wavelength region, and/or bear a group M which represents a mesogenic group exhibiting form anisotropy.

In the first step a homopolymer is prepared which is used as macroinitiator for the second component of the block copolymer (BCP). Preferably the macroinitiator is a non-functionalised homopolymer which serves as a solubility promoter in the polymerisation of the functionalised monomers.

A further possibility for the synthesis of the desired block polymers consists in the use of the technique of anionic polymerisation with subsequent polymer-analogous conversion for the introduction of the side group.

Use is made as the monomers to be functionalised later of methacrylic acid derivatives which bear instead of the OH group an OH—$(CH_2)_n$—OH group, where 2 to 6 is possible as n. For the anionic polymerisation the OH group is masked by a protective group, wherein trimethylsilyl or tert.butyldimethylsilyl are described as particularly favourable.

EXAMPLES

Example I

Synthesis of Compound BCP1

The polymerisation is carried out according to the following synthesis specification, the macroinitiator being prepared first of all.

The addition of the monomer (n-butyl acrylate), the ligand (PMDETA), decane as inner standard and the liquid initiator (MBP) takes place under inert gas atmosphere. 2 g of n-butyl acrylate, 5 g of ethyl acetate and 44.8 mg of copper(I)bromide are used for the polymerisation in each case. 0.2 g of decane are used as internal standard for the conversion determination by gas chromatography.

The polymerisation is concluded by rapid cooling to 5° C. and addition of THF. The separation of the copper bromide out of the polymer solution takes place by filtration on activated aluminium oxide. Both acid and basic material may be used for this. The polymerisation temperature amounted to 80° C. The preparation of the block copolymer takes place by dissolving of the corresponding amount of the macroinitiator described above (n-polybutyl acrylate, $M_n$=13000 g/mol) in ethyl acetate (1 ml). The monomer (570 mg) (see I) is likewise dissolved in ethyl acetate (2.5 ml) and both solutions are degassed. The addition of the ligand (48.5 µl) (PMDETA) and copper(I)bromide (33 mg) takes place in the inert atmosphere.

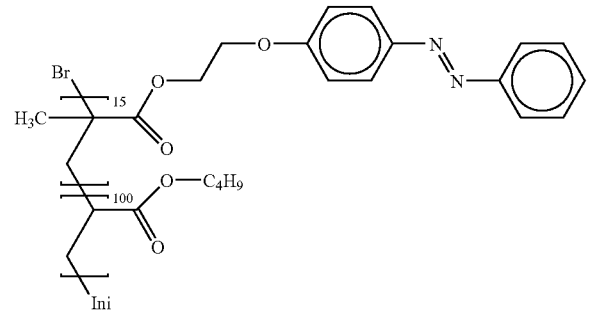

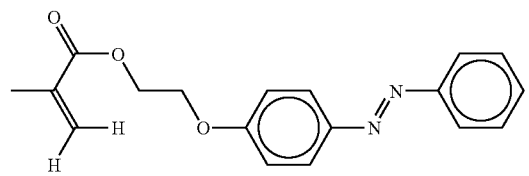

(I)

Example II

Synthesis of Compound BCP2

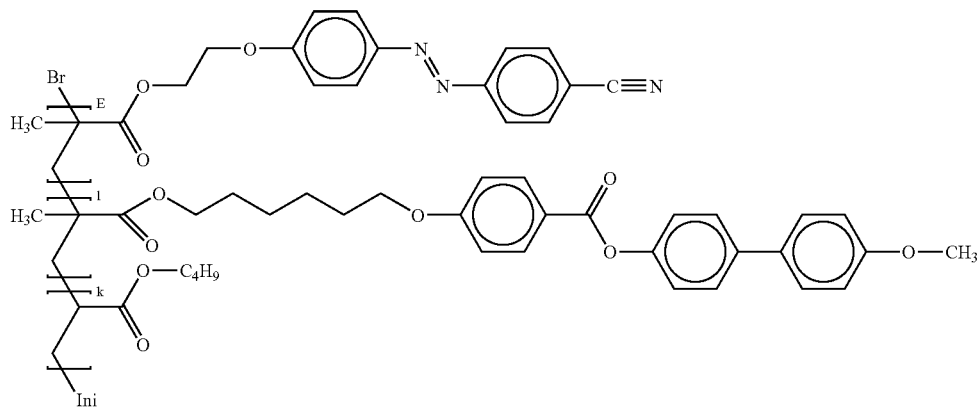

The macroinitiator is prepared analogously to Example 1, but a block length of 19000 g/mol referred to styrene calibration is prepared by corresponding reduced addition of the amount of initiator.

The initiator prepared is used analogously to the above specification for the preparation of the block copolymer. In this case 1.5 g of the macroinitiator (n-polybutyl acrylate, $M_n$=19000 g/mol) are dissolved in 1.5 ml of ethyl acetate. The functionalised monomers given below (II: 151 mg, III: 499 mg) are dissolved in 2 ml of ethyl acetate and both solutions are mixed after the degassing under inert atmosphere.

23.8 mg of copper(I)bromide and 34.8 μl of the ligand (PMDETA) are added to the solution. The reaction is carried out at 55° C. The working up of the polymer takes place analogously to Example 1.

The B block consists here, however, of a statistical copolymer whose monomers bear side groups which correspond to the properties of the above-mentioned A or M type. The molar ratios amount to 30:70 (A:M) here.

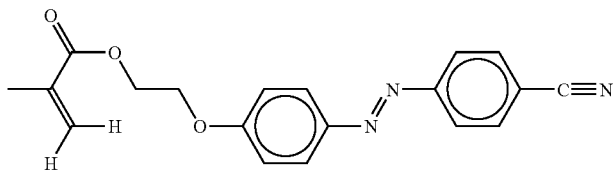
(II)

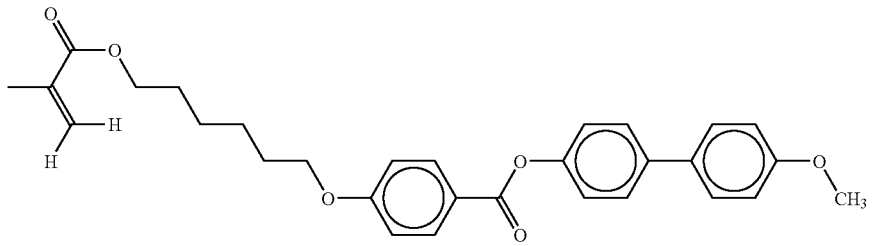
(III)

Alternatively an anionic polymerisation and polymer-analogous conversion may take place.

Example III

Synthesis of the Following Compound

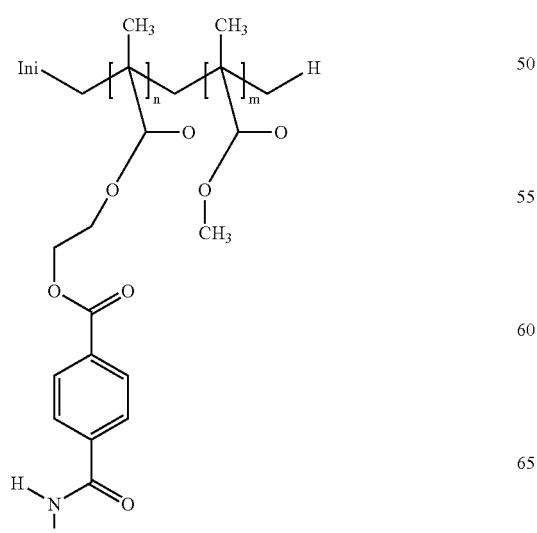

-continued

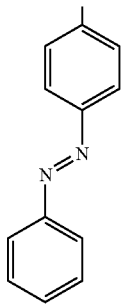

The polymerisation is carried out according to the following synthesis specification. 400 ml of THF are heated for several days over potassium and then fed into a reactor (inert gas) under inert gas atmosphere. The solution is cooled to 55° C. The 1.69 ml initiator solution (1.3 molar sec. BuLi solution in hexane) and then 0.85 ml of diphenyl ethylene solution are added through a septum. After 5 minutes the hydroxyethyl methacrylate (10.4 g) protected by tert.butyldimethylsilyl is added via the septum. After 40 minutes the methyl methacrylate (105 g) is added to the reactor via an ampoule and the temperature is set at 0° C. After 30 minutes the polymerisation is concluded by the addition of 1 ml of methanol. The polymer is precipitated in a 10-fold excess of methanol solution and re-precipitated several times prior to further use.

The silyl protection group is split off from the block copolymer by the block copolymer being dissolved in dioxane and a 4-fold excess of semi-concentrated hydrochloric acid is added. The unprotected block copolymer is dried for several days under high vacuum prior to the polymer-analogous reaction. The polymer is then dissolved in dry THF and the azo acid chloride is added slowly drop-wise dissolved in N-methyl pyrrolidone under inert gas atmosphere. To accelerate the reaction, an excess of pyridine is added. The reaction time amounts to 48 h at 55° C. After the reaction the unreacted azo dye is separated.

The alternative synthesis of AB block copolymers takes place by anionic polymerisation of methacrylates and protected methacrylates.

The polymerisation takes place according to general specification (Henry L. Hsieh, Roderic P. Quirk, 1996, Marcel Dekker, in particular p. 640 ff.) on the anionic polymerisation of methacrylates in THF. The splitting off of the protective group takes place by precipitation of the polymer in methanol or dissolving in dioxane and heating with the addition of dilute hydrochloric acid. The bonding of the side group, which may bear a group A, which may absorb electromagnetic radiation, and/or a group M, which represents a mesogenic group exhibiting form anisotropy, takes place by conversion with an acid chloride which represents the terminal group of the side chain.

In the application optical elements are understood to be the diffractive and holographic optical elements.

The application therefore provides a method for preparing the AD block copolymers according to the invention, wherein polymers with defined structure and molecular weight of the individual blocks in the copolymer are synthesised by controlled polymerisation and there are used as techniques here both the anionic polymerisation of monomers, including in some cases protected OH-functionalised monomers on an acrylate and methacrylate base, and controlled radical polymerisation of functionalised monomers.

The copolymers according to the invention may be used excellently for the production of optical elements and stores, which are used preferably for the storage of data, wherein particularly preferably holography is used.

This is justified by the fact that very good information may be inscribed into the optical element by means of a laser beam.

The application preferably provides high-volume stores containing at least one copolymer according to the invention, which possess a transilluminated thickness of $\geq 0.1$ mm, preferably $\geq 0.5$ mm, particularly preferably $\geq 1.0$ mm, most particularly preferably between 1 mm and 1 cm.

The production of high-volume stores in the form of films, sheets, plates and cuboids is possible without cumbersome orientation methods with the use of external fields and/or surface effects being required. They may be applied to substrates by means of spin coating, dipping, pouring or other coating methods easy to master technologically, brought between two transparent plates by pressing or inflow, or simply prepared as a self-supporting material by pouring or extruding. Such films, sheets, plates and cuboids may be produced by abrupt cooling, i.e. by means of a cooling rate of >100 K/min, or by rapid extraction of the solvent also out of liquid-crystalline polymers or oligomers which contain structural elements in the sense described.

The layer thickness is $\geq 0.1$ mm, preferably $\geq 0.5$ mm, particularly preferably $\geq 1$ mm. A particularly preferred preparation method for layers in the millimetre range is represented by the injection moulding method. In this the polymer melt is pressed through a nozzle into a forming support, from which it may be removed after the cooling. The application also provides high-volume stores which are protected against mechanical damage by a protective layer.

The method of holographic data storage is described for example in LASER FOCUS WORLD, NOVEMBER 1996, p. 81 ff.

During the writing of a hologram the polymer films described above are irradiated by two coherent laser beams of a wavelength which produces the required light-induced reorientations. The one beam, the object beam, contains the optical information to be stored, for example the intensity curve which results from the passage of a light beam through a two-dimensional, chessboard-type pixel structure (data side). In principle, however, there may be used as the object beam, light which is diffracted, scattered or reflected from any two- or three-dimensional object. On the storage medium the object beam is caused to undergo interference with the second laser beam, the reference beam, which is in general a level or circular wave. The resulting interference pattern is impressed in the storage medium as a modulation of the optical constants (refractive index and/or absorption coefficient). Said modulation traverses the whole of the irradiated area, in particular the thickness of the storage medium. If now the object beam is blocked off and the medium is illuminated solely with the reference beam, the modulated storage medium functions as a kind of diffraction grating for the reference beam. The intensity distribution resulting from the diffraction corresponds to the intensity distribution which issued from the object to be stored, so that it may no longer be distinguished whether the light comes from the object itself, or whether it results by virtue of the diffraction of the reference beam.

Various multiplex methods may be used for the storage of various holograms at a sample position: wavelength multiplexing, shift multiplexing, phase multiplexing, peristrophic multiplexing and/or angular multiplexing. With angular multiplexing the angle between the storage medium, in which a hologram has been stored under the current angles, and the reference beam is changed. From a certain change in angle onwards the original hologram disappears (Bragg mismatch): the incident reference beam may no longer be deflected by the storage medium for the reconstruction of the object. The angle from which this occurs depends critically on the thickness of the storage medium (and on the modulation of the optical constants which is produced in the medium): the thicker the medium, the smaller is the angle through which the reference beam must be changed.

In said new angular configuration a further hologram may be inscribed. The reading out of said hologram functions again in precisely the same angular configuration between storage medium and reference beam as it was written in.

Several holograms may therefore be inscribed at the same point of the storage medium by successive changing of the angle between medium and writing beams.

The application provides all the polymers, methods and uses described in the claims. The application provides a method for producing optical elements and storage elements, preferably holographic high-volume stores, by injection moulding.

The application provides a method for producing optical elements and storage elements, preferably holographic high-volume stores, by injection moulding, wherein in addition the moulding is polished.

A polishing of the mouldings takes place until such time as the wave-front distortion and the surface phenority is better than $$\frac{\lambda}{10}.$$

The wave-front distortion is determined by the imaging of the moulding onto e.g. a CCD camera during the exposure of the latter to a beam of the writing laser of the wavelength λ.

The application provides a method for producing optical elements and storage elements, preferably holographic high-volume stores, by injection moulding, wherein in addition a transparent protective layer is applied.

The application provides optical elements and stores, preferably high-volume stores, particularly preferably holographic high-volume stores, according to the invention.

What is claimed is:

1. A block copolymer comprising at least one block (A) having at least 3 repeat units with the general formula (CI)

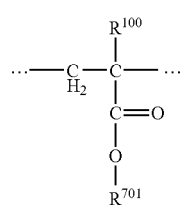

(CI), where
$R^{100}$ represents hydrogen or methyl and
$R^{701}$ represents hydrogen or $C_1$–$C_8$ alkyl, and
at least one block (B) having repeat units with the general formula (CII)

(CII)

where
$R^{702}$ represents hydrogen or methyl and
$R^{703}$ [STPQ], wherein [SPTQ] is represents either $S^1$-$T^1$-$Q^1$-A or $S^2$-$T^2$-$Q^2$-M where
$S^1$, $S^2$ signify independently of one another the atoms O, S or the group $NR^1$,
$R^1$ signifies hydrogen or $C_1$–$C_4$alkyl,
$T^1$, $T^2$ signify independently of one another the group $(CH_2)_n$,
n signifies the numbers 2, 3 or 4,
and each of $Q^1$ and $Q^2$ denotes a divalent group,
A is a unit which absorbs electromagnetic radiation and is represented by the formula

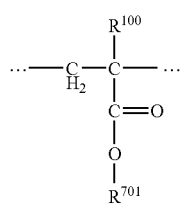

(CI)

where
$R^2$ to $R^7$ signify independently of one another hydrogen, hydroxyl, halogen, nitro, cyano, $C_1$–$C_4$-alkyl, $C_1$–$C_4$alkoxy, $CF_3$, $CCl_3$, $CBr_3$, $SO_2CF_3$, $C_1$–$C_6$-alkyl-sulfonyl, phenylsulfonyl, $C_1$–$C_6$-alkylaminosulfonyl, phenylaminosulfonyl, aminocarbonyl, $C_1$–$C_6$-alkylaminocarbonyl, phenylaminocarbonyl or $COOR^1$, M is a polarizable aromatic group having at least 12 π-electrons and is represented by the formula

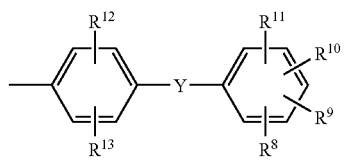

where
$R^8$ to $R^{13}$ signify independently of one another hydrogen, hydroxyl, halogen, nitro, cyano, $C_1$–$C_4$ alkyl, $C_1$–$C_4$ alkoxy, $CF_3$, $CCl_3$, $CB_3$, $SO_2CF_3$, $C_1$–$C_6$ alkyl-sulfonyl, phenylsulfonyl, $C_1$–$C_6$-alkylaminosulfonyl, phenylaminosulfonyl, aminocarbonyl, $C_1$–$C_6$-alkylaminocarbonyl, phenylaminocarbonyl or $COOR^1$ and Y signifies —COO—, —OCO—, —CONH—, —NHCO—, —O—, —NH—, —N(CH₃)— or a single bond with the proviso that at least one unit of polymer (B) contains S¹-T¹-Q¹-A.

2. The block copolymer of claim 1 wherein said $R^{701}$ represents a member selected from the group consisting of methyl, ethyl, propyl and n-butyl.

3. The block copolymer of claim 1 wherein said $R^{701}$ represents methyl.

4. The block copolymer of claim 1 wherein said $T^1$, $T^2$ signify independently of one another $(CH_2)_n$, that is interrupted by —O—, —NR¹— or —OSiR¹₂O— and/or is substituted by methyl or ethyl.

5. The block copolymer of claim 1 wherein said S¹-T¹-Q¹-A conform to a member selected from the group consisting of

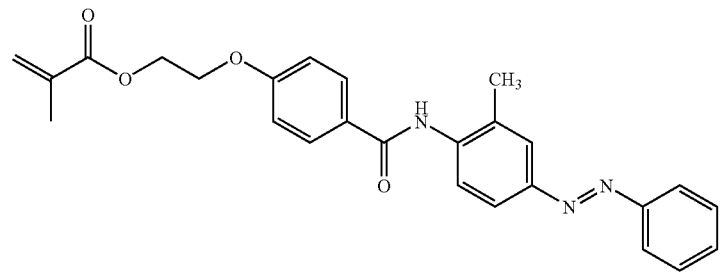

(VI)

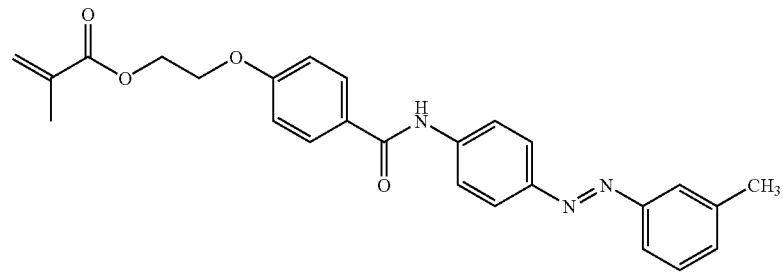

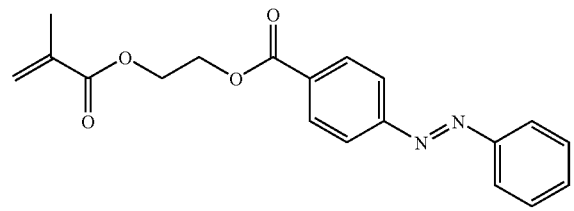

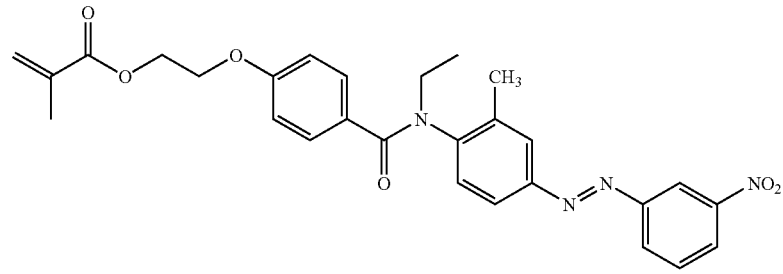

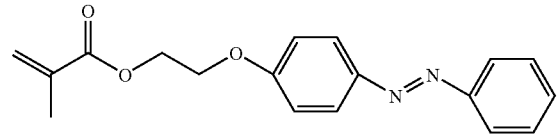

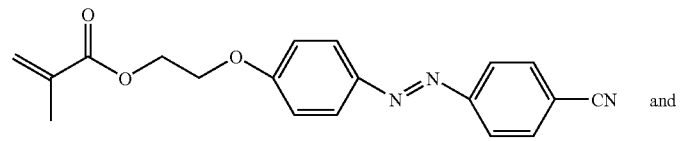

and

-continued

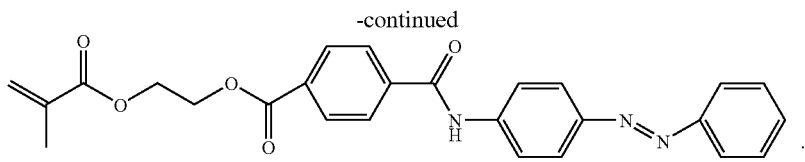

6. A block polymer according to claim 1 characterised in that at least five repeat units are contained in the block (A).

7. A block polymer according to claim 1 characterised in that at least three repeat units are contained in the block (B).

8. A block polymer according to claim 1 characterised in that more than 1 block (A) and/or (B) is contained.

9. A block polymer according to claim 1 characterised in that the ratio of the sum of the monomers of block (B) to the sum of the monomers of block (A) lies between 1:1 and 1:10000.

10. A block polymer according to claim 1 characterised in that block (A) contains methyl methacrylate units.

11. A block polymer according to claim 1 characterised in that block (B) contains at least two different monomers with the general formula [STQP], wherein at least one of said monomers is a photoisomerisable group.

12. A block polymer according to claim 1 wherein said M is at least one member selected from the group consisting of

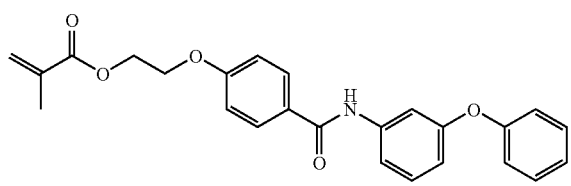

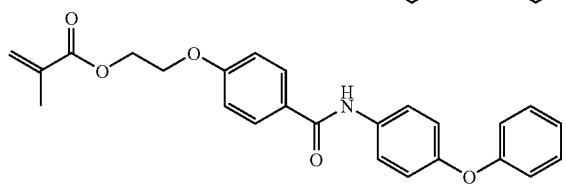

and

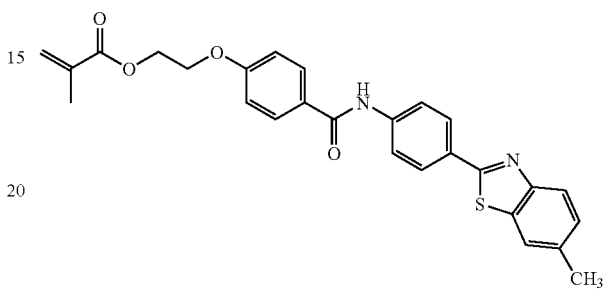

13. A process of using the polymer of claim 1 comprising producing an optical data storage medium.

14. The process of claim 13 wherein the storage of data is by holography.

15. The process of claim 13 wherein the data is inscribed into the storage medium by means of a laser beam.

16. A data storage medium comprising the polymer according to claim 1 having a transilluminated thickness of $\geq 0.1$ mm.

17. A process of making an optical storage element comprising molding the polymer of claim 1 by injection molding.

18. The process of claim 17 further comprising polishing the storage element.

19. The process of claim 17 further comprising applying to the storage element a transparent protective layer.

20. The optical element prepared by the process of claim 17.

* * * * *